(12) United States Patent
Mikhailov et al.

(10) Patent No.: US 10,525,335 B2
(45) Date of Patent: Jan. 7, 2020

(54) HEAD MOUNTED DISPLAY

(71) Applicant: Sony Interactive Entertainment Inc., Tokyo (JP)

(72) Inventors: Anton Mikhailov, San Mateo, CA (US); Xiaodong Mao, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 787 days.

(21) Appl. No.: 14/996,163

(22) Filed: Jan. 14, 2016

(65) Prior Publication Data

US 2016/0129346 A1   May 12, 2016

Related U.S. Application Data

(63) Continuation of application No. 14/296,379, filed on Jun. 4, 2014, now Pat. No. 9,630,098.
(Continued)

(51) Int. Cl.
*G06F 1/00* (2006.01)
*A63F 13/213* (2014.01)
(Continued)

(52) U.S. Cl.
CPC ............ *A63F 13/213* (2014.09); *A63F 13/00* (2013.01); *A63F 13/211* (2014.09);
(Continued)

(58) Field of Classification Search
CPC .......... G09G 5/00; G09G 5/377; G02B 27/01; G06F 3/013; G06F 3/012; G06F 3/016; G06F 3/01
See application file for complete search history.

(56) References Cited

U.S. PATENT DOCUMENTS 6,061,916 A    5/2000  Stevens et al.
6,630,915 B1  10/2003  Flood ............................... 345/8
(Continued)

FOREIGN PATENT DOCUMENTS

JP    08-006708    12/1996    ............. G06F 3/033
JP    11-312033     9/1999    ............... G06F 3/00
(Continued)

OTHER PUBLICATIONS

Decision of Refusal for Japanese Patent application No. 2016-517974, dated Oct. 24, 2017, Dispatch No. 467806.
(Continued)

*Primary Examiner* — Michael A Faragalla
(74) *Attorney, Agent, or Firm* — Penilla IP, APC

(57) ABSTRACT

A system and method for operating a head mounted display (HMD) is provided. The HMD has a head attachment portion and a viewing module coupled to the head attachment portion. The viewing module includes an inner side having a view port into a screen configuring for rendering a virtual reality scene and an exterior housing. A communications module for exchanging data with a computer system is provided and the computer system is configured to generate the virtual reality scene for the screen. A depth camera is integrated into the viewing module and is oriented to capture depth data of an environment in front of the exterior housing. One method includes processing, by the computer system, the depth data captured by the depth camera to identify hands of a user wearing the HMD in the environment. The hands are rendered into the virtual reality scene. The hands are tracked such that movements of the hands appear as movements of virtual hands extending into the virtual reality scene.

13 Claims, 11 Drawing Sheets

Related U.S. Application Data

(60) Provisional application No. 61/832,918, filed on Jun. 9, 2013.

(51) Int. Cl.

| | |
|---|---|
| *G09G 3/00* | (2006.01) |
| *G02B 27/01* | (2006.01) |
| *G09G 3/34* | (2006.01) |
| *H04N 13/254* | (2018.01) |
| *H04N 13/271* | (2018.01) |
| *A63F 13/00* | (2014.01) |
| *G06F 3/01* | (2006.01) |
| *A63F 13/285* | (2014.01) |
| *A63F 13/26* | (2014.01) |
| *A63F 13/211* | (2014.01) |
| *A63F 13/42* | (2014.01) |
| *A63F 13/5255* | (2014.01) |
| *A63F 13/212* | (2014.01) |
| *G06T 19/00* | (2011.01) |
| *A63F 13/803* | (2014.01) |

(52) U.S. Cl.
CPC ............ *A63F 13/212* (2014.09); *A63F 13/26* (2014.09); *A63F 13/285* (2014.09); *A63F 13/42* (2014.09); *A63F 13/5255* (2014.09); *G02B 27/017* (2013.01); *G02B 27/0176* (2013.01); *G02B 27/0179* (2013.01); *G06F 3/012* (2013.01); *G06F 3/013* (2013.01); *G06T 19/006* (2013.01); *G09G 3/001* (2013.01); *G09G 3/3406* (2013.01); *G09G 3/3413* (2013.01); *H04N 13/254* (2018.05); *H04N 13/271* (2018.05); *A63F 13/803* (2014.09); *A63F 2300/301* (2013.01); *A63F 2300/8082* (2013.01); *G02B 2027/0112* (2013.01); *G02B 2027/0138* (2013.01); *G02B 2027/0187* (2013.01); *G09G 2320/0233* (2013.01); *G09G 2320/0626* (2013.01)

(56) References Cited

U.S. PATENT DOCUMENTS

| | | | |
|---|---|---|---|
| 8,049,775 B2 | 11/2011 | Maeda | 348/47 |
| 9,041,623 B2 | 5/2015 | Liu et al. | 345/7 |
| 9,245,501 B2 | 1/2016 | Liu et al. | 345/7 |
| 2008/0266386 A1 | 10/2008 | Maeda | 348/47 |
| 2009/0237355 A1 | 9/2009 | Orion et al. | 345/156 |
| 2010/0182340 A1* | 7/2010 | Bachelder | G02B 27/017 345/633 |
| 2010/0309097 A1 | 12/2010 | Raviv et al. | 345/8 |
| 2012/0186953 A1 | 7/2012 | Furukawa | 200/43.21 |
| 2012/0327116 A1 | 12/2012 | Liu et al. | 345/633 |
| 2013/0093789 A1* | 4/2013 | Liu | G09G 5/377 345/633 |
| 2015/0235632 A1 | 8/2015 | Liu et al. | 345/7 |

FOREIGN PATENT DOCUMENTS

| | | | |
|---|---|---|---|
| JP | 2005-293141 | 10/2005 | ............... G06T 1/00 |
| JP | 2008-077572 | 3/2008 | ............... G06F 3/01 |
| JP | 2010-257461 | 11/2010 | ............. G06T 17/40 |
| JP | 2011-258158 | 12/2011 | |
| JP | 2012-223363 | 11/2012 | ............... A61B 1/00 |
| JP | 2013-12024 | 1/2013 | ............. G06F 3/038 |
| JP | 2013-73434 | 4/2013 | ............. G06F 3/042 |
| TW | 201312384 A | 3/2013 | ............... G06F 3/01 |

OTHER PUBLICATIONS

Decision to Dismiss the Amendment for Japanese Patent application No. 2016-517974, dated Oct. 24, 2017, Dispatch No. 467805.
Taiwan IPO Search Report, App. No. 103119754, dated Dec. 21, 2015.
Chinese Patent Application No. 201480038692.7, dated Nov. 1, 2017, Dispatch No. PYD13979A.
JP App. No. 2017-070090, Ref. F011-0031A, Dispatch No. 567781, Notification of Reason(s) for Refusal, English translation, dated Jan. 9, 2018.
JP App. No. 2017-070090, Ref. F011-0031A, Dispatch No. 567781, Notification of Reason(s) for Refusal, Japanese language, dated Jan. 9, 2018.
Notification of Reason(s) for Refusal for Japanese Patent application No. 2016-517974, dated Mar. 14, 2017.

* cited by examiner

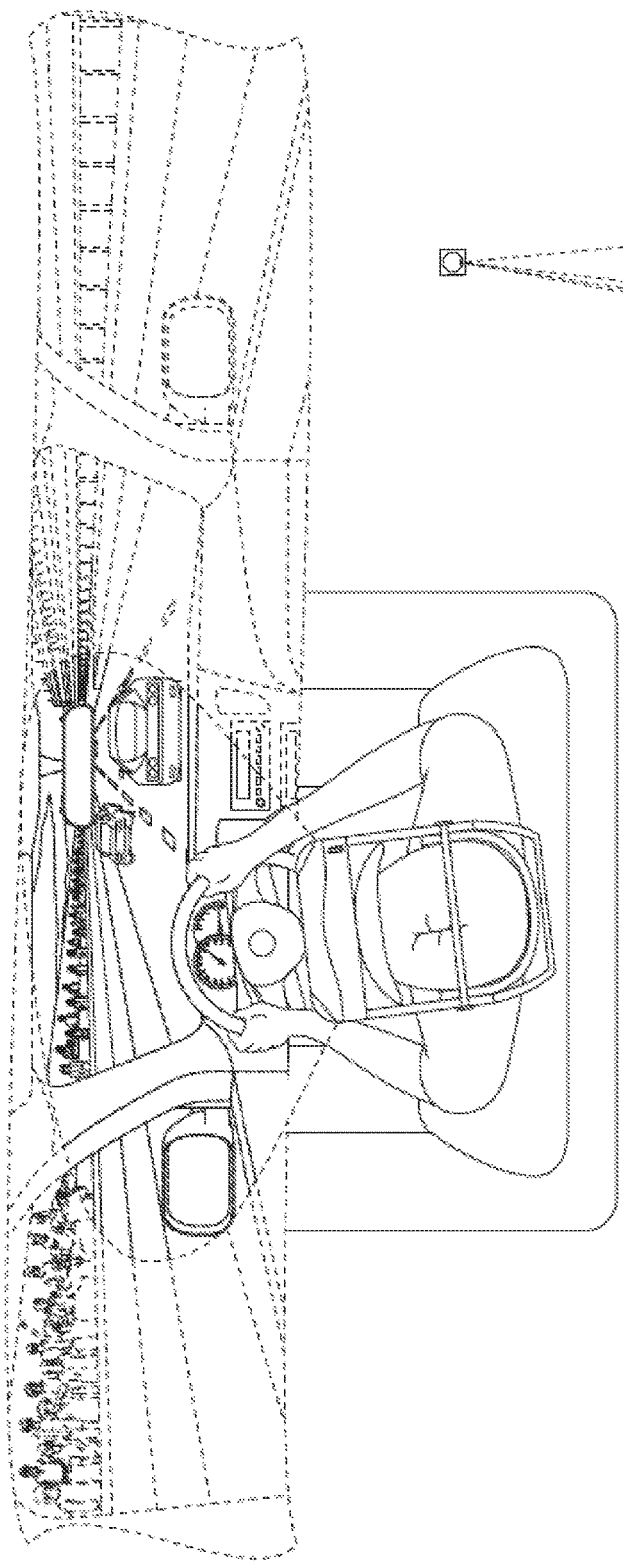
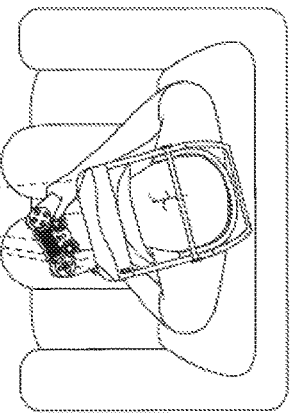
FIG. 5A
FIG. 5B

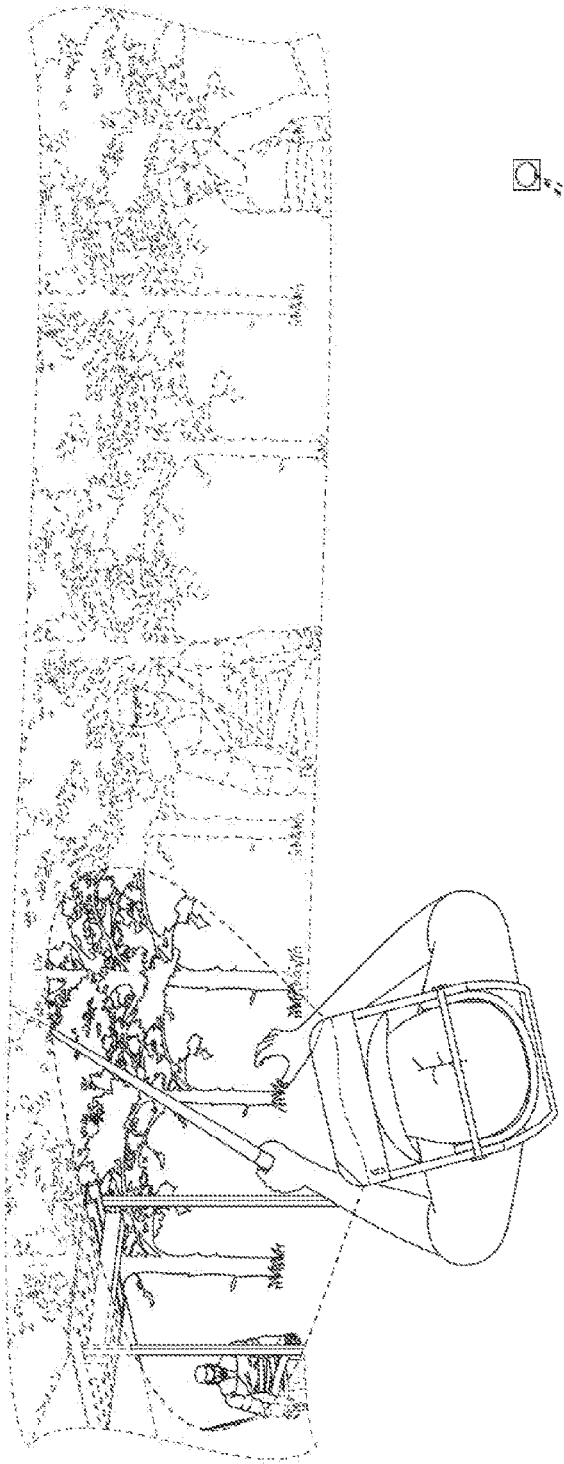
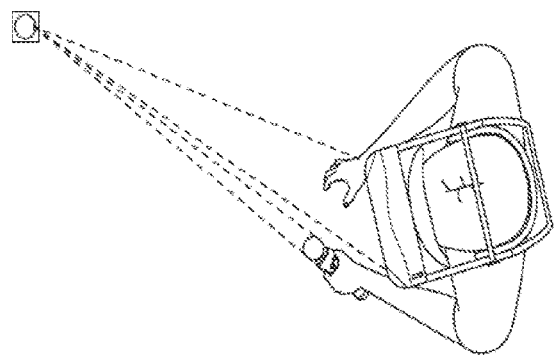
FIG. 8A
FIG. 8B

HEAD MOUNTED DISPLAY

CLAIM OF PRIORITY

This is a continuation of U.S. application Ser. No. 14/296,379, filed on Jun. 4, 2014, and entitled "Head Mounted Display", and which claims priority from U.S. Provisional Patent Application No. 61/832,918, filed Jun. 9, 2013, and entitled "Head Mounted Display Gaming System," which are incorporated herein by reference.

BACKGROUND

1. Field of the Invention

The present invention relates to methods and systems for gameplay using a head-mounted display (HMD) and a controller, and HMD apparatus units.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience. However, gaming using HMD devices still need much improvement.

It is in this context that embodiments of the invention arise.

SUMMARY

Embodiments of the present invention provide methods and systems for rendering games on a head mounted display (HMD). In some embodiments, game play may be correlating or carried out with a controller used by a user. The methods define ways of tracking the HMD and the controller and providing immersive interactivity. The tracked HMD and controller enable correlated interactive play within three-dimensional spaces. It should be appreciated that the present invention can be implemented in numerous ways, such as a process, an apparatus, a system, a device or a method on a computer readable medium. Several inventive embodiments of the present invention are described below.

In one embodiment, a system and method for operating a head mounted display (HMD) are provided. The HMD has a head attachment portion and a viewing module coupled to the head attachment portion. The viewing module includes an inner side having a view port into a screen configuring for rendering a virtual reality scene and an exterior housing. A communications module for exchanging data with a computer system is provided and the computer system is configured to generate the virtual reality scene for the screen. A depth camera is integrated into the viewing module and is oriented to capture depth data of an environment in front of the exterior housing. One method includes processing, by the computer system, the depth data captured by the depth camera to identify hands of a user wearing the HMD in the environment. The hands are rendered into the virtual reality scene. The hands are tracked such that movements of the hands appear as movements of virtual hands extending into the virtual reality scene.

In another embodiment, a head mounted display is disclosed, which includes a head attachment portion. Also included is a viewing module coupled to the head attachment portion. The viewing module includes an inner portion having a view port into a screen configuring for rendering image content, and an exterior housing. Further included is a plurality illuminating elements integrated with the exterior housing of the viewing module. The plurality of illumination elements defined for image tracking of the head mounted display, and illumination logic for controlling the plurality of illumination elements to be active or inactive.

In some embodiments, the data exchanged by the communications module includes input data, image data, audio data, and inertial data.

In some embodiments, the plurality illuminating elements are defined as light emitting diodes (LEDs) or infrared (IR) emitters.

In some embodiments, the LEDs are defined to illuminate one or more colors, the illumination of the one or more colors being controlled by illumination logic.

In some embodiments, the plurality illuminating elements are arranged in a defined pattern on the exterior housing.

In some embodiments, the exterior housing has a partially curved shape, and the plurality illuminating elements are arranged in a pattern about the partially curved shape.

In some embodiments, the exterior housing has multiple surface regions, and the plurality illuminating elements are arranged in a pattern about the multiple surface regions.

In some embodiments, wherein the plurality of illumination elements include two or more shapes or sizes.

In some embodiments, wherein additional ones of the plurality of illumination elements are connected to the head attachment portion.

In another embodiment, a head mounted display (HMD) is disclosed. The HMD includes a head attachment portion for placement on a head of a user and a viewing module coupled to the head attachment portion and configured for placement in front of eyes of a user. The viewing module includes an inner side having a view port into a screen configuring for rendering image content and an exterior housing that surrounds the inner side. The HMD further includes a communications module for exchanging data with a computer system. The data includes input data, image data, audio data, and inertial data (and others data is possible). The HMD also includes an image processing module for processing the image data for rendering the image content on the screen and a plurality illuminating elements integrated with the exterior housing of the viewing module. The plurality of illumination elements are defined for image tracking of the head mounted display by a camera. The HMD also includes illumination logic for controlling particular ones of the plurality of illumination elements to be active and/or inactive at particular times, or on during use.

In some embodiments, the exterior housing has a front facing portion, a first side portion, and a second side portion.

In some embodiments, a first of the plurality of illumination elements is disposed on a left side of the front facing portion and a second of the plurality of illumination elements is disposed on a right side of the front facing portion.

In some embodiments, the first of the plurality of illumination elements has a two-part shape that is disposed partially in the front facing portion and the first side portion, and the second of the plurality of illumination elements has a two-part shape that is disposed partially in the front facing portion and the second side portion.

In some embodiments, the plurality illuminating elements are defined as light emitting diodes (LEDs) or infrared (IR) emitters.

In some embodiments, the LEDs are defined to illuminate one or more colors, the illumination of the one or more colors being controlled by illumination logic.

In some embodiments, the plurality illuminating elements are arranged in a defined pattern on the exterior housing.

In some embodiments, the communications module is one of a wired connection or wireless connection with the computer.

In some embodiments, the inertial data is generated by the head mounted display in response to detected movement when worn by the user.

In some embodiments, the input data is generated by the head mounted display in response to user input when worn by the user.

In some embodiments, the audio data and the image data is associated with interactive media content to be rendered at the head mounted display.

In some embodiments, the interactive media content includes game data, video data, internet navigation data, combinations of game data and internet data, social media data, or combinations thereof.

In some embodiments, the exterior housing has a partially curved shape, and the plurality illuminating elements are arranged in a pattern about the partially curved shape.

In some embodiments, the exterior housing has multiple surface regions, and the plurality illuminating elements are arranged in a pattern about the multiple surface regions.

In some embodiments, the plurality of illumination elements include two or more shapes or sizes.

In some embodiments, additional ones of the plurality of illumination elements are connected to the head attachment portion.

In some embodiments, the plurality illuminating elements are arranged in a defined pattern on the exterior housing.

In another embodiment, a head mounted display is disclosed. The head mounted display includes a body that includes a head attachment portion and a viewing module. The viewing module includes an inner portion having a view port into a screen configuring for rendering image content, and the body includes an exterior housing covering the view module. The head mounted display further includes a plurality illuminating elements integrated with the exterior housing of the viewing module. The plurality of illumination elements are defined for image tracking of the head mounted display. The plurality of illumination elements are arranged in pattern. Also included is illumination logic for controlling the plurality of illumination elements to be active to facilitate the image tracking.

A method for executing a game presented on a screen of a head mounted display (HMD) is provided. Execution renders interactive scenes of the game on the screen. The method includes receiving data of the HMD worn by a user to identify an HMD spatial position. The method also includes receiving data of a controller held by the user to identify a controller spatial position. During game play, the method includes rendering a point of view into the interactive scenes of the game on the screen, where the point of view is a volume of space rendered in three-dimensions. The method includes adjusting the point of view as the HMD spatial position is detected to change. The controller can drive interactivity in the game and changes in position of the controller and the HMD are correlated to provide an immersive three-dimensional game play experience.

In some embodiments, the controller provides input that drives interactivity.

In some embodiments, changes in the controller spatial position provide additional input.

In some embodiments, the additional input includes one of lights or inertial data.

In some embodiments, the lights provide location data when viewed by a camera and a color of the lights provide additional data.

In some embodiments, the color indicates player number or mode or setting based on room conditions.

In some embodiments, the controller is represented in the interactive scenes as a virtual object, the virtual object rendered in the interactive scenes in a virtual spatial position that substantially maps to the controller spatial position, and changes in the controller spatial position change the virtual spatial position of the virtual object as shown on the screen.

In another a method for executing a game presented on a screen of a head mounted display (HMD) is provided. The method includes executing a game, where the execution renders interactive scenes of the game on the screen. The method includes: receiving data of the HMD worn by a user to identify an HMD spatial position; receiving data of a controller held by the user to identify a controller spatial position; rendering a point of view into the interactive scenes of the game on the screen; and adjusting the point of view as the HMD spatial position is detected to change, the method being executed by a processor.

In some embodiments, the controller is represented in the interactive scenes as a virtual object, the virtual object rendered in the interactive scenes in virtual spatial position that maps to the controller spatial position, and changes in the controller spatial position change the virtual spatial position of the virtual object.

In some embodiments, the interactive scenes are rendered in a three-dimension format, such that objects in the interactive scenes appear in front of the HMD and extend a distance into the interactive scenes.

In some embodiments, the HMD and controller spatial positions are tracked using one or more of image data, inertial data, wireless data, infrared data, or combinations thereof.

In some embodiments, tracking using image data includes detecting one or both of the HMD and controller spatial positions using a stereo camera that provides depth data.

In another embodiment, a method for executing a game presented on a screen of a head mounted display (HMD) is provided. The method includes executing a game, where the execution renders interactive scenes of the game on the screen. The method includes: receiving images of the HMD worn by a user to identify an HMD spatial position relative to a capture location that is directed toward the user; receiving images of a controller held by the user to identify a controller spatial position relative to the capture location, the controller providing input to at least partially drive interaction with the game being executed; rendering a point of view into the interactive scenes of the game on the screen; and adjusting the point of view as the HMD spatial position is detected to change in the received images of the HMD.

In some embodiments, the controller is represented in the interactive scenes as a virtual object, the virtual object rendered in the interactive scenes in a virtual spatial position that maps to the controller spatial position, and changes in the controller spatial position change the virtual spatial position of the virtual object.

In some embodiments, the game is executed on a computer that is communicative connected to the head mounted display.

In some embodiments, the game is executed on a game cloud and the head mounted display is communicatively connected to the game cloud.

In some embodiments, each of the HMD spatial position and the controller spatial position is additionally identifiable by inertial data.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 5A-9B illustrate additional examples of a user wearing an HMD and holding controllers and changing the viewpoints into the interactive scene generated for video games, in accordance with an embodiment of the invention.

DETAILED DESCRIPTION

Figure 1:
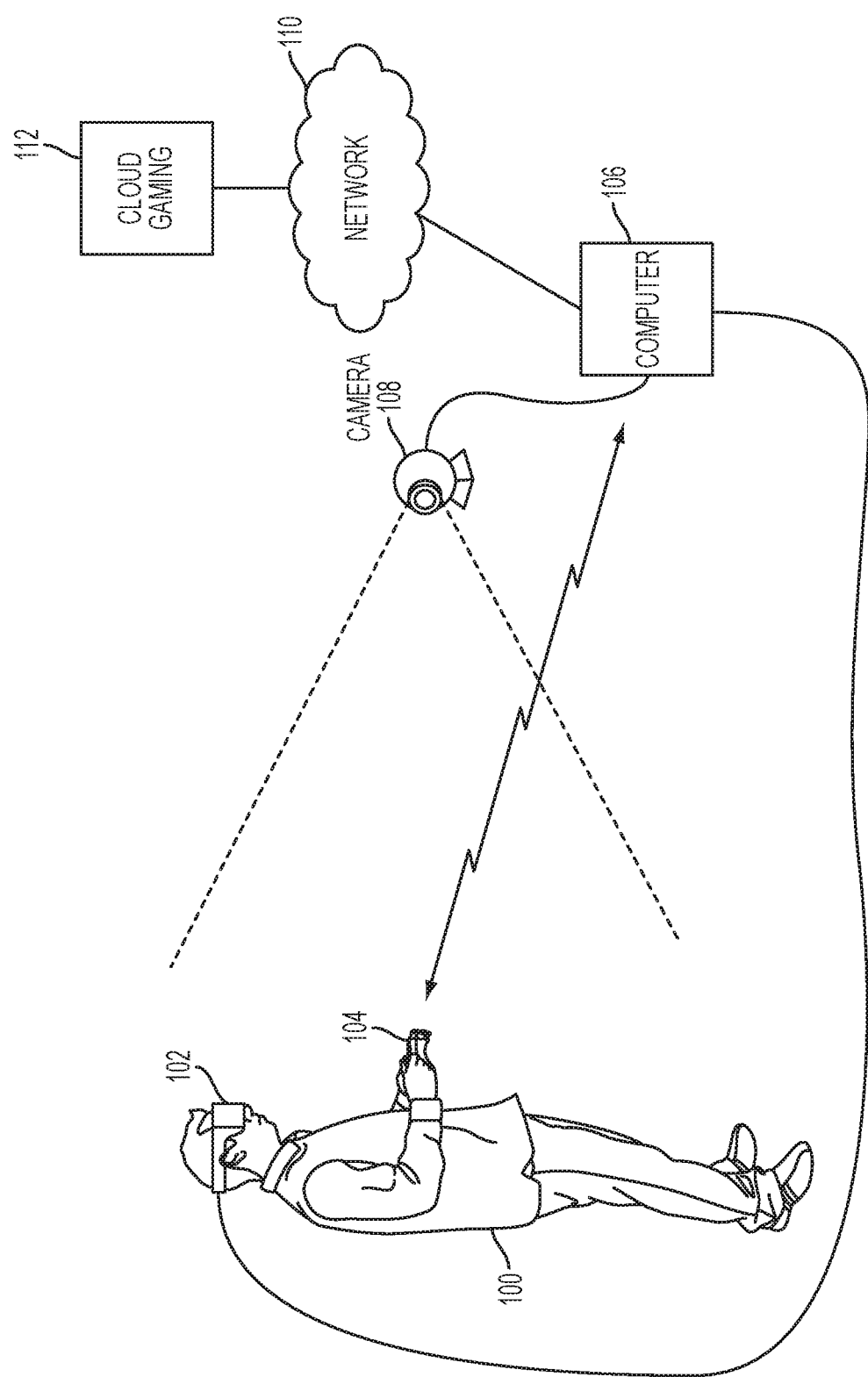
FIG. 1 illustrates a system for interactive gameplay of a video game, in accordance with an embodiment of the invention.

FIG. 1 illustrates a system for interactive gameplay of a video game, in accordance with an embodiment of the invention. Although examples are provided herein with reference to video games and games, the embodiments can also be used in different environments and tools. Such environments can include business tool environments, presentations tools, conference call systems, virtual visit programs, virtual project collaboration, sharing of information and social interactions, social networking, social data mining, communication, etc.

In a video game example, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light which can be tracked to determine its location and orientation. Additionally, as described in further detail below, the HMD 102 may include one or more lights which can be tracked to determine the location and orientation of the HMD 102. The lights are considered illumination objects.

In one embodiment, an illumination object is one that can emit light or glow to provide a visible difference when viewed by a human eye and/or viewed by a camera or image detecting device, or detector, or receiver. In one embodiment, the illumination object can emit light that is human visible and in others not human visible. The illumination object may, in one embodiment, emit infrared (IR) light via IR emitters. In one example, the illumination object may be one or more light emitting diodes (LEDs). Each diode may emit white light, or a colored light of various shades. In some embodiments, the illumination objects may be placed under a surface that is at least partially transparent. The surface may be a cover, such that the cover may glow or appear in one or more colors.

In some embodiments, the illumination objects are integrated into the body or housing of the HMD, are placed under light or transparent plastic on the HMD, are exposed on the surface of the HMD, are placed under color shields/materials that illuminate in particular colors, and/or are arranged in specific shapes to improve detectability, improve tracking (e.g., to identify tilt, roll, yaw, and depth). In various examples, the HMD may include various illumination objects at various locations, such that the HMD can be tracked from the front, the sides and the back. In one embodiment, the illumination object may be added to the headband of the HMD, such illumination objects can be attached to the sides of the head band at various locations, which may increase tracking when the user is moving, turning, turning in circles, etc.

In one embodiment, illumination logic may be integrated into the HMD. The HMD may include one or more circuits for activating the illumination objects. In simple configurations, the illumination logic may be defined by wires that connect to the illumination objects to a circuit, a switch, a trigger, a chip, a controller, a CPU (central processing unit), DSP (digital signal processor), an ASIC (application specific integrated circuit), and/or firmware and/or software. The illumination object can thus control when one or all of the illumination objects turn on, stay on, flicker, turn on/off with a code, turn a color, turn specific colors to differentiate multiple HMD players of a game, etc. In some embodiments, the circuit of the HMD can include logic for receiving and processing image data.

The image data received, e.g., from a computer or game console, may be received by the HMD and processed. The processing of the data can include rendering the image data onto a viewing module. The viewing module may include a screen, which renders the images for viewing via the HMD. In some embodiments, the screen of the HMD may be defined a two separate screens, e.g., one for each eye. In another embodiment, the screen may be a single screen, whereby each eye is allowed to focus on the screen using optics.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location.

Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless.

Figure 2:
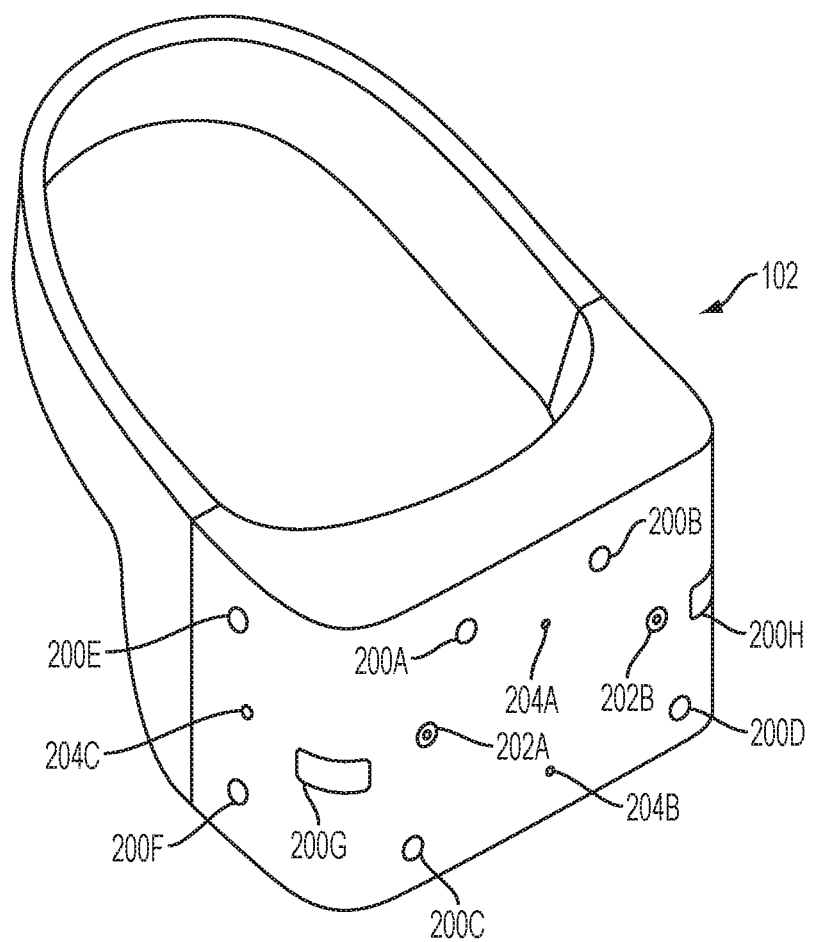
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights may also be oriented and defined on the HMD in particular patterns to improve tracking. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
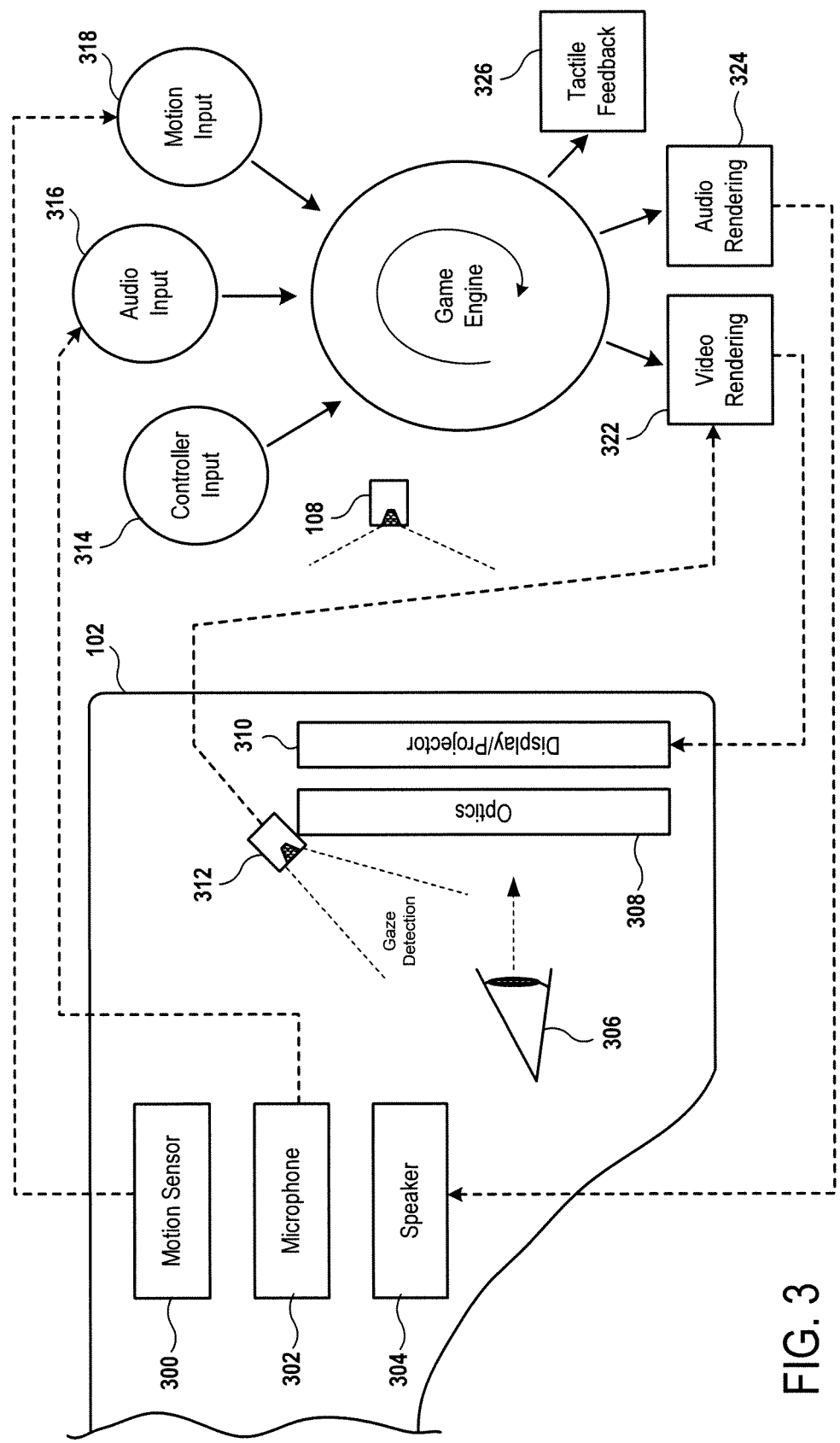
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as controller 104. By way of example, controller input 314 may include directional inputs, button presses, trigger activation, movements, or other kinds of inputs processed from the operation of a gaming controller. The audio input 316 can be processed from a microphone 302 of the HMD 102, or from a microphone included in the image capture device 108. The motion input 218 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking a specific direction, then the video rendering for that direction can be prioritized or emphasized, such as by providing greater detail or faster updates in the region where the user is looking.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

Figure 4A:
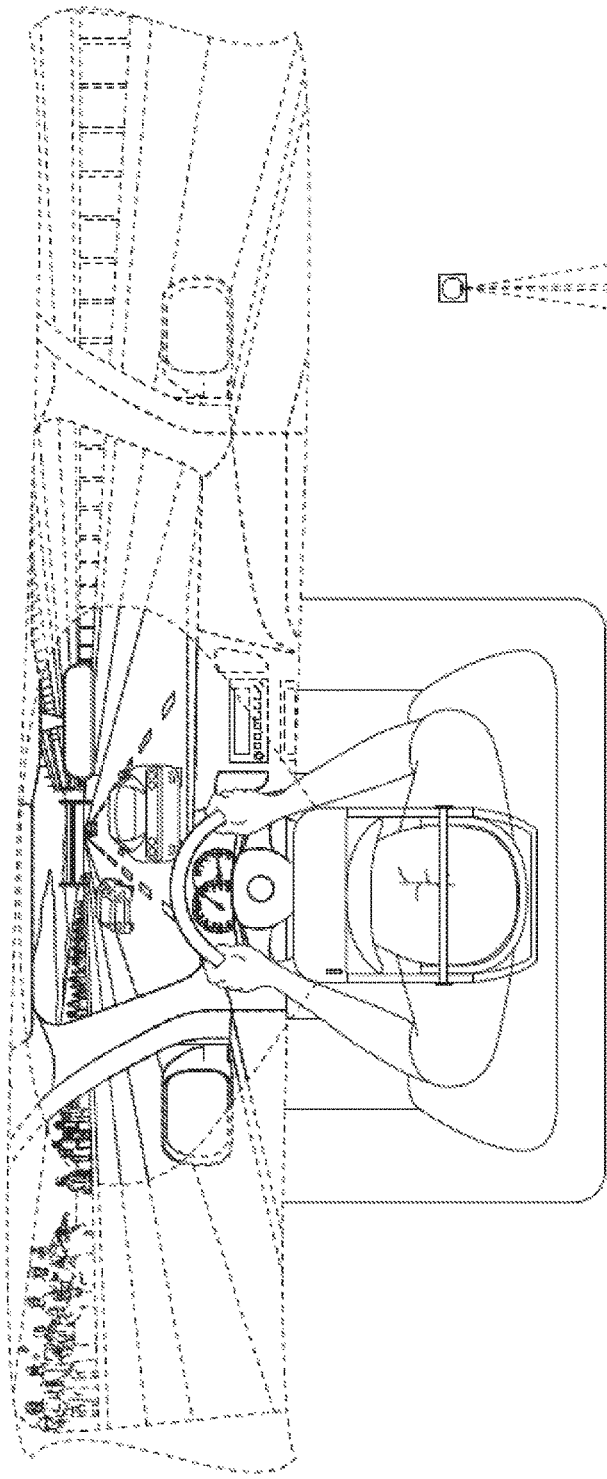
FIG. 4A-4B illustrate examples of virtual spaces viewable in 3D from the HMD and interactions with a controller and coordination thereof, in accordance with an embodiment of the invention.
Figure 4B:
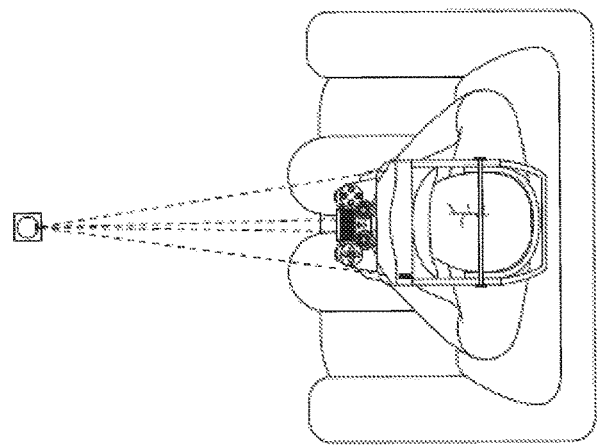

FIG. 4A illustrates a three-dimensional view into an interactive space, that shows scenes of videogame play by a user, in accordance with one embodiment. In this example, the user is wearing a head mounted display (HMD) and is holding a controller, as shown in FIG. 4B. In one embodiment, the user is being monitored by a camera, that is directed toward the user as shown in FIG. 4B. The camera can be a mono camera or a stereo camera that can identify depth. The camera can identify the controller and the head mounted display during gameplay. The identification of the controller and the head mounted display will identify a spatial position of each. The spatial position of each can be tracked to identify movements of the controller and the head mounted display independently. The tracking can include identifying the positions and changes in position rates and changes of position, etc. using the images captured by the camera. In another embodiment, the controller and the HMD will each includes circuitry, including inertial sensors that can communicate data back to a base station computer. The data containing inertial sensor data (and other date) can be processed to identify the positions, changes in positions, rates of change of position, and other 6 axes type data elements.

Accordingly, it should be understood that some embodiments will include a camera while other embodiments will not include a camera. In the embodiment where a camera is used, the user is detected to be facing forward when playing the game, as shown in FIG. 4A. As the user holds the controller, as shown in FIG. 4B, the user's hands may appear to extend into a three-dimensional scene rendered in the screen of the HMD. In one embodiment, the viewpoint into the scenes of the interactive content generated by the executing game, will change. The change, in one embodiment is driven by the position or view provided by the users head movements, when wearing the head mounted display.

To illustrate the viewpoint into the interactive space, the area that the user views is shown within the dashed lines that outline a 3D volume. Interactive scene data that is not viewable, since the users not viewing that particular region or direction, is shown in dashed lines in the figures. In operation, the content in dashed lines is not rendered until the user views in that particular location or direction. However, to provide clarity regarding the ability of the user to view specific portions of the interactive scene in the screen of the head mounted display, the dashed lines have been provided.

In one embodiment, the position of the user's hands when holding the controller can be detected and can be shown to enter the screen of the HMD as if the user was extending his hand into the interactive scene. This is illustrated in FIG. 4A, where the user is holding a steering wheel in a videogame depicting a race car scene. It should be noted that the drawings of the HMD are only illustrative of an R&D type HMD, and a commercial embodiment may be produced in a more ergonomic and finished product manner.

The HMD can provide the user with a view into the interactive scene. The controller held by the user, as shown in FIG. 4B illustrates that the user can be playing a game where motions, positions, button inputs, etc., are tracked and correlated to the input provided to the game executed on a computer system. As described below, the computer system may be a game console, a standalone computer, a tablet, a smart phone, a web-based computer, a cloud server, or any other system capable of processing instructions. In yet another embodiment, the controller and or the HMD can communicate directly with a network. The network and then communicate with a cloud system for executing instructions.

FIG. 5A illustrates an embodiment where the user has turned his head to the left, exposing additional viewpoints into the interactive scene. FIG. 5B illustrates the position of the real world user turning his head to the left, which triggered the rendering of a different three-dimensional scene in front of the user, as viewed from the screen of the head mounted display. In addition, FIG. 5B illustrates the user turning the controller to the left. The turn to the left can be gradual or abrupt, and can be detected using inertial sensors of the controller, where such data is transferred to a computing device for processing. In another embodiment, the movement of the controller can be monitored by the camera that detects a different spatial position. The different spatial position can be monitored by identifying the position or orientation, or position and orientation of the controller as viewed by the camera.

As shown in FIG. 5A, the user's movement of the controller to the left represented in FIG. 5B, will cause the user to turn the steering wheel to the left in the virtual scene. Thus, the user's actions with the controller can be represented in the virtual scene, as seen from the screen of the head mounted display. At the same time, the viewpoint into the virtual scene, as shown in FIG. 5A will also change, based on the detected position and orientation of the head mounted display. Detecting the position of the head mounted display can be by way of identifying lights, markers, infrared lighting, or combinations thereof.

In other embodiments, identification of the spatial position of the head mounted display can be by way of tracking inertial sensors in the head mounted display. In still other embodiments, a camera can track the position of the head without detecting sensors, but by simply detecting the position of the head using three-dimensional depth mapping. Accordingly, both motions of the controller and motions of the head mounted display can be tracked, and the independent motion positions, changes in positions, changes in movement rates, and other input type movements can be tracked and correlated to one another. The correlation can be by way of a mapping algorithm that tracks the motions of the controller and head mounted display, and the resulting view in the head mounted display screen can change according to the motions and movements of the head mounted display and the interactive feedback provided by the controller held by the user.

Accordingly, the mapping between the actions of the user's head and the actions with the controller are shown by referencing the movements of the actual real world user in FIG. 5B, and the viewpoint into the scene shown in FIG. 5A. As noted above, the user, in one embodiment is able to reach in to the interactive scene as perceived by the user. That is, the user is provided a viewing sensory that the user has actually reached into the scene and is holding an actual steering wheel. To the user, when the user views his or her hands, virtual hands holding the steering wheel are rendered. Movements of his or her hands will then be substantially mapped and correlated to the movements of the virtual hands in the scene. In one embodiment, the virtual hands can be augmented reality or virtual reality. One augmented reality view can be one where an image of the user's actual hands are slightly augmented in the view provided by the head mounted display screen.

Although hands are described as being able to reach into the scene, any body part that can be viewed via the HMD can also be rendered in the scene to provide the appearance that the user is actually present in the 3D scene. Additionally, the user can hold other controllers or wear clothing that can be tracked to provide the ability to blend into the scene, so as to blur the real and virtual world outlines. In still other embodiments, the user can wear clothes or gloves that are provided with tactile feedback, so that actions in the virtual scene are translated to the real world. If the user reaches into a virtual scene, the user can shake the hand of a virtual character, and the grasp of the hand can be simulated using tactile feedback to the glove.

Figure 6A:
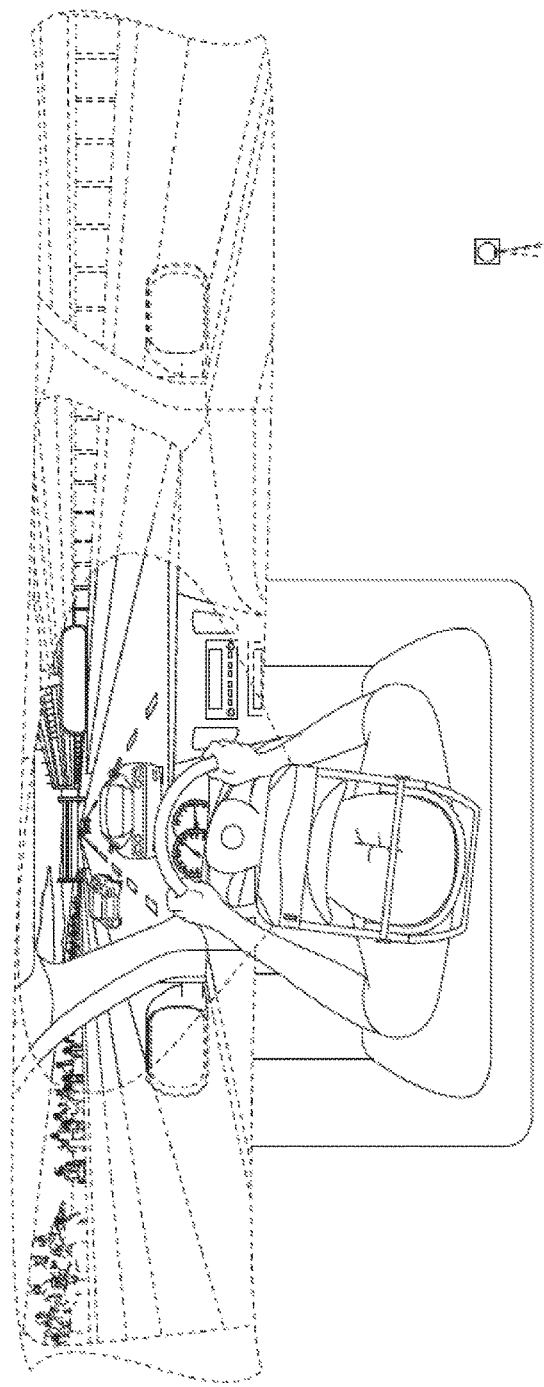
Figure 6B:
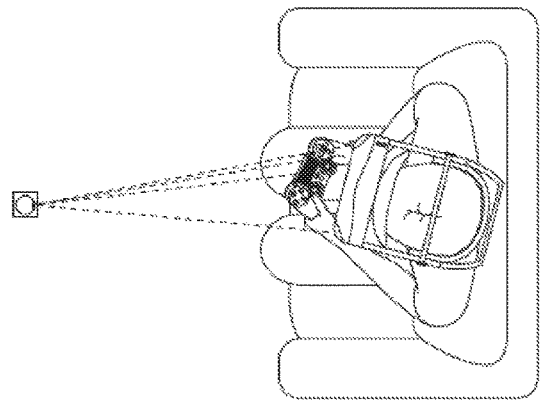

FIGS. 6A and 6B illustrates an example where the user has turned his head to the right and also turn the controller to the right. In FIG. 6A, the user's virtual hands appeared to turn the steering wheel of the race car to the right. The images seen into the three-dimensional space, as provided in the screen of the head mounted display, show the changes made as a result of the user turning the controller to the right. At the same time, the user has turned his head slightly to the right, which is a typical natural movement made in real life when turning a steering wheel to the right. This real world movement will therefore convey the same movement in the virtual environment illustrated in the head mounted display screen.

FIG. 6A shows the steering wheel turned to the right and the viewpoint into the virtual scene shifted to the right. As noted above, the dashed lines outside of the viewpoint into the three-dimensional space are provided to simply provide an illustration that additional virtual environments exist beyond that which the user is currently viewing. The extensions beyond the regions where the user is currently viewing, in one embodiment, is a natural extensions of the current virtual viewpoint. That is, if the user is viewing straightforward in a race car, the user turning his head to the left can actually view out the left side window of the race car. If a spectator (or object) is standing to the left of the race car in the stands, that spectator may come into view when the user has turned his head to the left, when driving by in the race car.

Figure 7A:
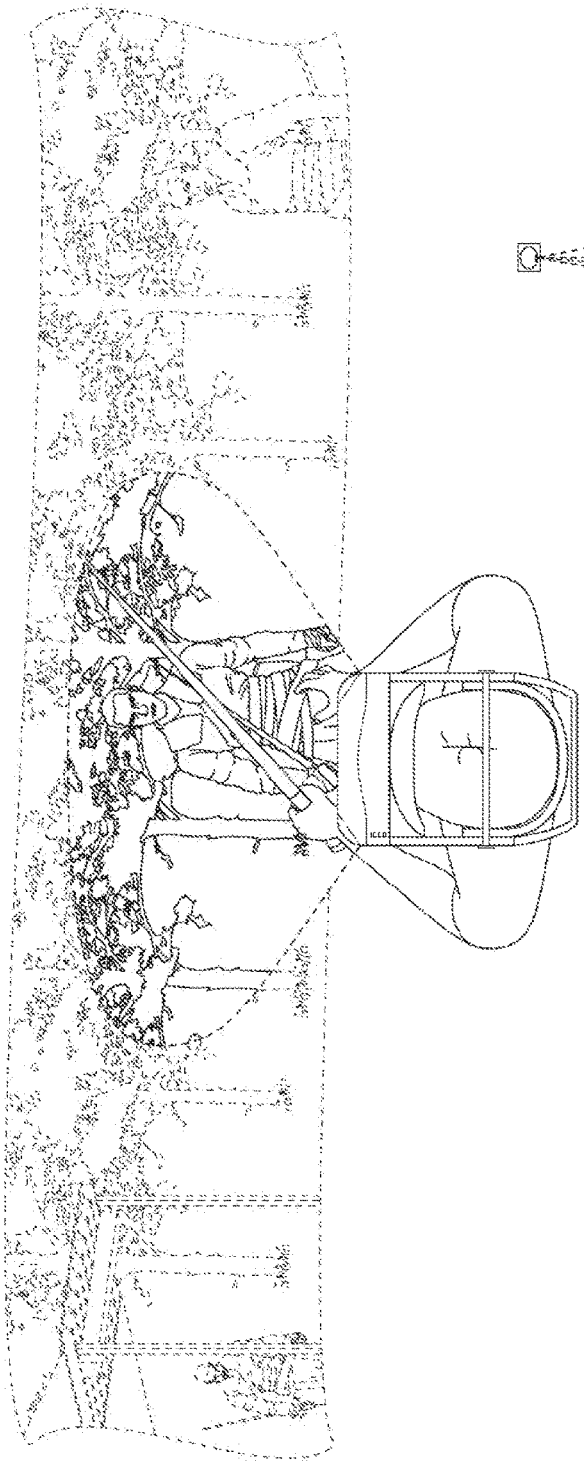
Figure 7B:
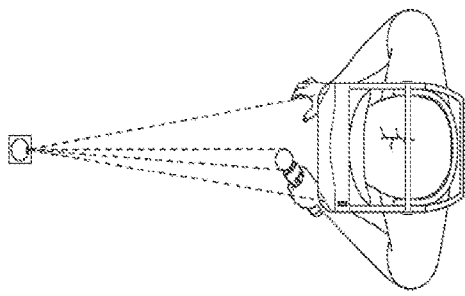

FIGS. 7A and 7B illustrate another embodiment, where the controller is a different type of controller. The type of controller shown is a MOVE™ controller, which is made by Sony Computer Entertainment Inc. This controller has a handle and a spherical object that lights up for tracking. The controller also includes an inertial sensor and other buttons for communicating information back to a base computer. In one embodiment, the camera can track the controller in 6 axes (e.g., X,Y,Z; pitch; roll; yaw). The camera can also be simultaneously tracking the head mounted display. In another embodiment, the head mounted display can be tracked using other tracking functions. The other tracking functions can include using inertial sensors, infrared camera lighting, sound, data input by buttons or motions, etc.

In the embodiment shown in FIGS. 7A and 7B, the user is moving the controller in FIG. 7B, which is represented as a sword in FIG. 7A. The user is interacting with characters or subjects of a game where movements of the controller are tracked to the movements of the virtual character participating in the game. The position of the controller and the position of the head mounted display (and associated motion), are tracked so as to provide a viewpoint into the virtual scene. In this example, to the user playing the game using the head mounted display, the user holding the controller will appears as a virtual object (e.g., sword) in the virtual game. As shown, however, the user's arm appears and feels as if the user is extending into the 3D space, which is right in front of the user. Movements of the controller are mapped and correlated to the movements of the virtual object in the game.

In FIGS. 8A and 8B, the users shown to have moved his head to the left while maintaining the controller in the same position. The user's movement of the head exposes a new viewpoint into the scene as generated by the game being executed. Movement of the users head to the left will expose that new viewpoint showing additional interactive scene elements in the game, as if the game elements were real-world three-dimensional elements.

Figure 9A:
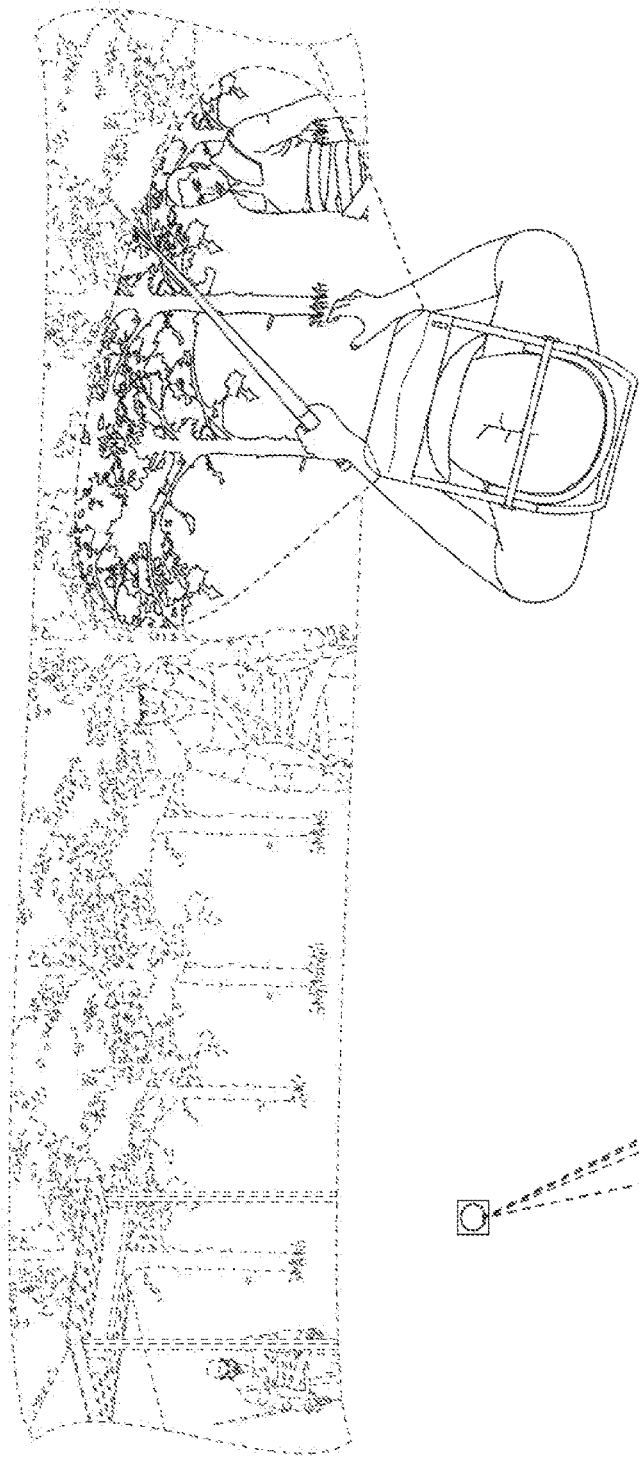
Figure 9B:
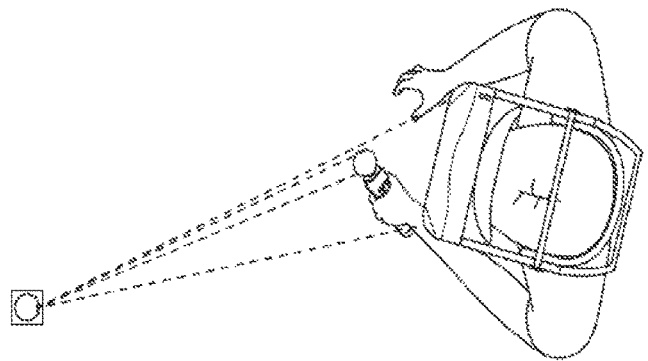

FIGS. 9A and 9B again show the user moving his head to the right and the controller slightly to the right. This will expose a new view into the interactive scene as shown in the screen of the head mounted display. In one embodiment, the mapping of the user's actions with the controller assist in driving the interactivity of the gameplay while coordinating the viewpoint into the scene using the positional information of the head mounted display.

Figure 10:
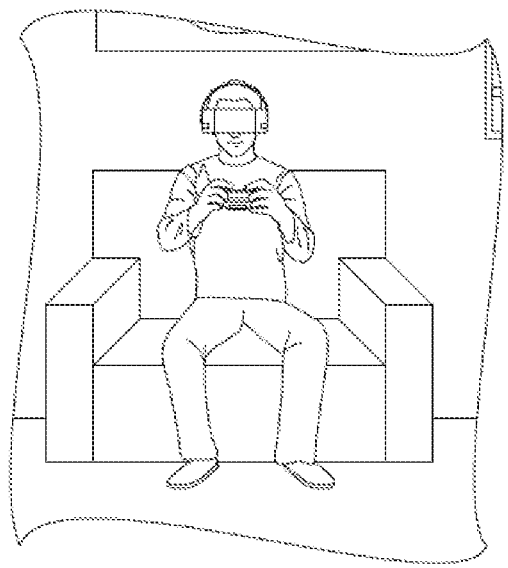
FIGS. 10 and 11 illustrate a user wearing an HMD and holding a controller, when interfacing with a video game.

FIG. 10 illustrates an example of a real-world player sitting holding a controller on his couch and wearing a head mounted display.

Figure 11:
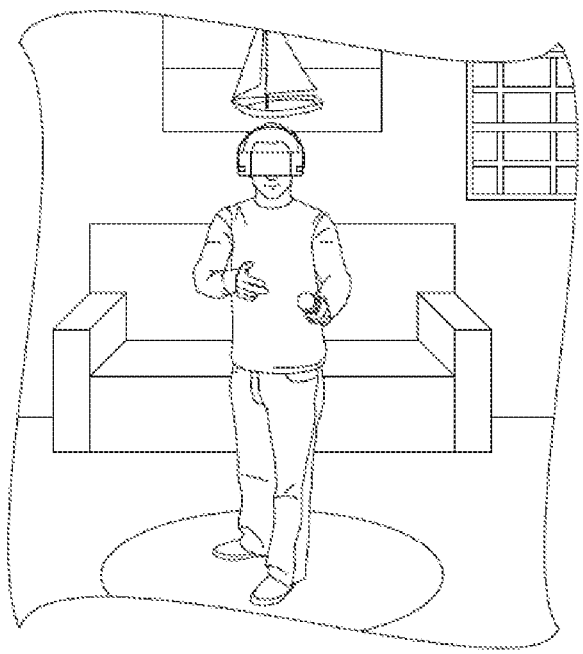

FIG. 11 illustrates the player standing up playing a game, where movements of the player's head and controller are tracked and conveyed in changes in the view point into the scene of the interactive three-dimensional environment.

In one embodiment, the controller can include one or more lights that are viewable by the camera. The lights can be provided in a shape so as to enable the camera to detect and orientation of the controller. The lights can be in the shape of a horizontal light bar, or as a plurality of lights. The lights can also be provided with various colors, which are identifiable by the camera. The colors can provide information regarding the player number, or can identify the controller in various environmental conditions.

The environmental conditions can include, for example, the lighting of the room in which the user is playing the game. In another embodiment, the conditions can include determining the background colors in the space where the player is playing. Based on the background colors, and appropriate color can be selected for the colors of the controller lights. For instance, if the background colors primarily red, a color other than red will be selected for the controller to provide better detectability or identification for improved tracking. In still another embodiment, the color can be selected from a predefined list of colors, where the selected color is one that passes a threshold of distinctiveness when compared to the background. In still another embodiment, the color select the controller can be one that is least (or close to the least) represented in the background scene. The selection of the colors for the controller can be adjusted from time to time, during calibration, during gameplay, during specific scenes in a game, during specific action sequences in a game, for communicating with other users in a multiplayer game environment, or at the control of the user by selecting buttons, or at the control of the computing device based on predefined algorithms, situations, rules, or combinations of rules and situations.

Figure 12:
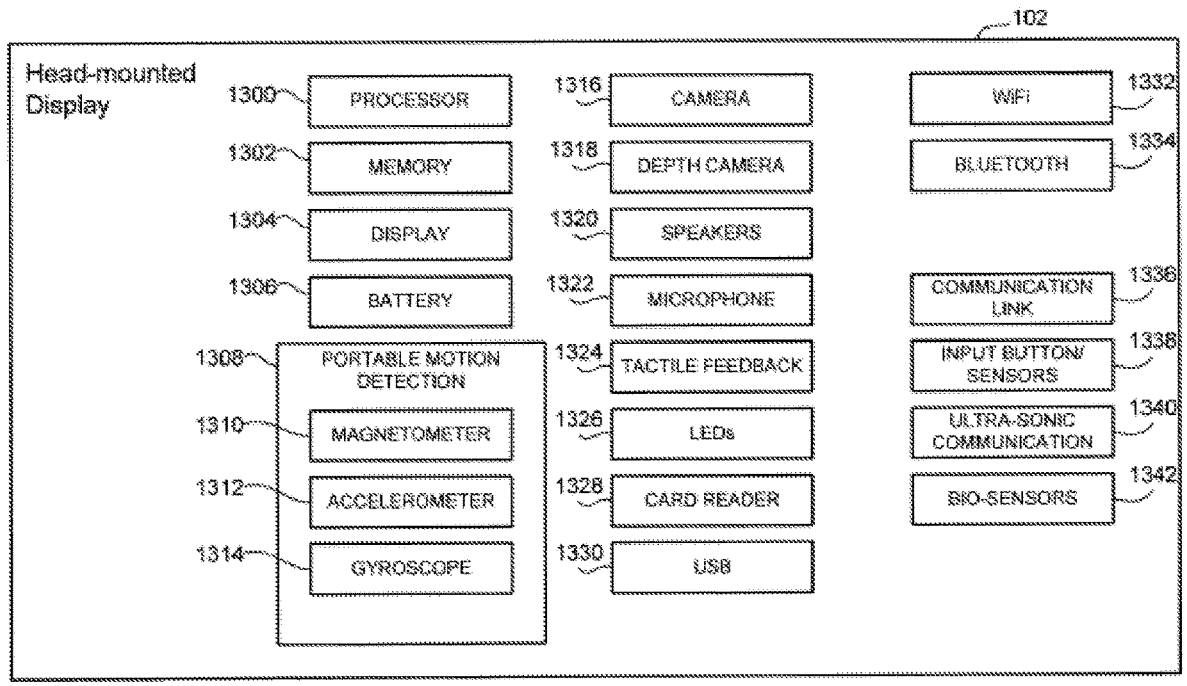
FIG. 12 illustrates components of a head-mounted display, in accordance with an embodiment of the invention.

With reference to FIG. 12, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 13:
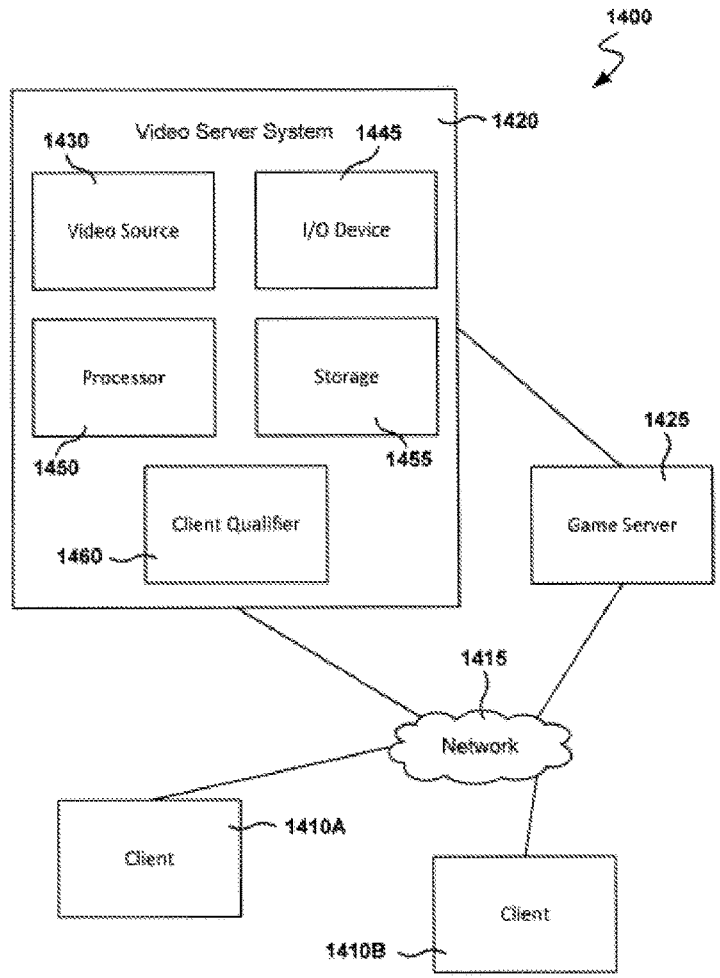
FIG. 13 is a block diagram of a Game System, according to various embodiments of the invention.

FIG. 13 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420.

Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A head mounted display (HMD) system, comprising,
a head attachment portion;

a viewer coupled to the head attachment portion, the viewer including an inner side having a view port into a screen configuring for rendering a virtual reality scene, and an exterior housing;

a communications device for exchanging data with a computer system, the computer system is configured to generate the virtual reality scene for the screen; and a depth camera integrated into the viewer and oriented to capture depth data of an environment in front of the exterior housing;

the computer system is configured to use the depth data captured by the depth camera to identify real objects in the environment, wherein a real object is rendered into the virtual reality scene, the real object being tracked such that movements of the real object appear as movements in the virtual reality scene, wherein the real object captured by the depth camera in the environment is a hand holding a controller, the hand being of a user wearing the HMD system, and said movements of the hand with the controller are rendered as a virtual hand holding a virtual reality object in the virtual reality scene, said movements of the virtual hand holding the virtual reality object are shown as a perspective via the view port in front of the user;

wherein a real arm of the user extended into the virtual reality scene enables the virtual hand to appear depth-wise as a continuation of the real arm to the virtual hand.

2. The HMD system of claim 1, wherein the virtual hand is rendered in the virtual reality scene along with the virtual reality object, wherein movement of the virtual hand in the virtual reality scene produces virtual interaction between the virtual reality object and the virtual hand.

3. The HMD system of claim 1, wherein the depth camera is configured to capture the hand of the user, the hand of the user is rendered in the virtual reality scene from a perspective of the user as if the user is reaching into the virtual reality scene.

4. The HMD system of claim 1, wherein the depth camera is configured to capture a second hand of the user, the second hand of the user being rendered into the virtual reality scene as a second virtual hand.

5. The HMD system of claim 1, wherein the data exchanged by the communications device includes input data, image data, audio data, or inertial data, or combinations of two or more thereof.

6. The HMD system of claim 1, wherein the exterior housing has one or more illuminating elements used to track the HMD using a camera directed toward the HMD when worn by a user, the camera being interfaced with the computer system.

7. The HMD system of claim 6, wherein the illuminating elements are defined as light emitting diodes (LEDs) or infrared (IR) emitters.

8. The HMD system of claim 7, wherein the LEDs are defined to illuminate in one or more colors, the illumination of the one or more colors being controlled by illumination logic when commanded by the computer system.

9. The HMD system of claim 1, wherein the communications device has one of a wired connection or wireless connection with the computer system.

10. The HMD system of claim 1, wherein inertial data is generated by inertial sensors integrated in the HMD, the inertial data produced in response to detected movement of the HMD when worn by a user.

11. The HMD system of claim 1, wherein audio data is provided to the HMD as associated with content of the virtual reality scene.

12. The HMD system of claim 11, wherein the content includes game data, video data, internet navigation data, interactive data, combinations of game data and internet data, social media data, or combinations thereof.

13. A method for operating a head mounted display (HMD), comprising, providing the HMD having a head attachment portion and a viewer coupled to the head attachment portion, the viewer including an inner side having a view port into a screen configuring for rendering a virtual reality scene, and an exterior housing;

providing a communications device for exchanging data with a computer system, the computer system is configured to generate the virtual reality scene for the screen;

providing a depth camera integrated into the viewer and oriented to capture depth data of an environment in front of the exterior housing; and processing, by the computer system, the depth data captured by the depth camera to identify hands of a user wearing the HMD in the environment, wherein the hands are rendered into the virtual reality scene, the hands being tracked such that movements of the hands appear as movements of virtual hands extending into the virtual reality scene, wherein at least one of virtual hands is rendered in the virtual reality scene along with a virtual reality object, wherein movement of the virtual hand in the virtual reality scene render virtual interaction between the virtual reality object and the virtual hand when the user moves the virtual hand to hold the virtual reality object, the virtual reality object being a controller;

wherein a real arm of the user extended into the virtual reality scene enables the virtual hand to appear depth-wise as a continuation of the real arm to the virtual hand.

* * * * *